July 2, 1929.　　　L. J. MORITZ　　　1,719,378
ROTARY ENGINE
Filed Dec. 8, 1926　　　2 Sheets-Sheet 2
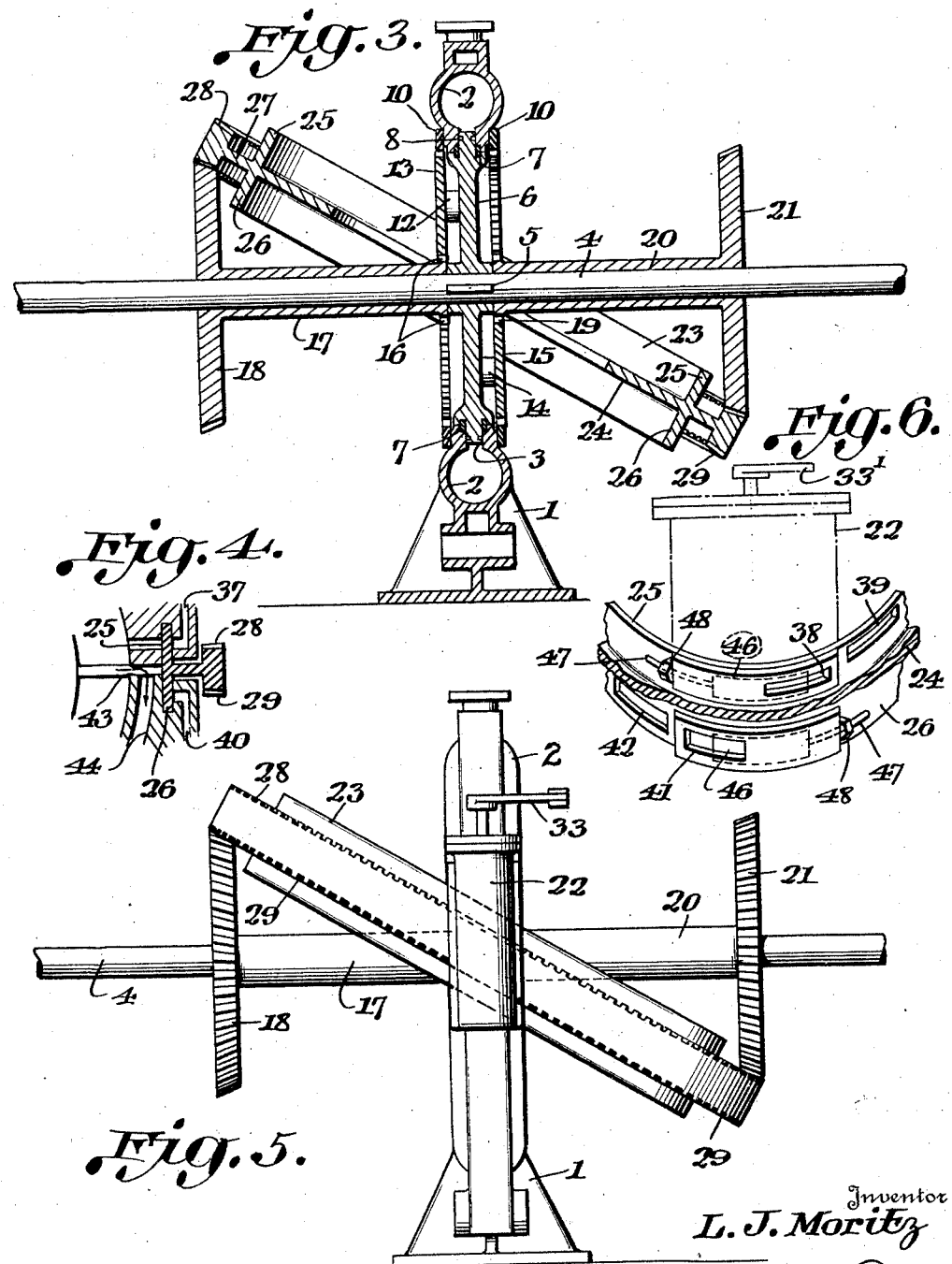

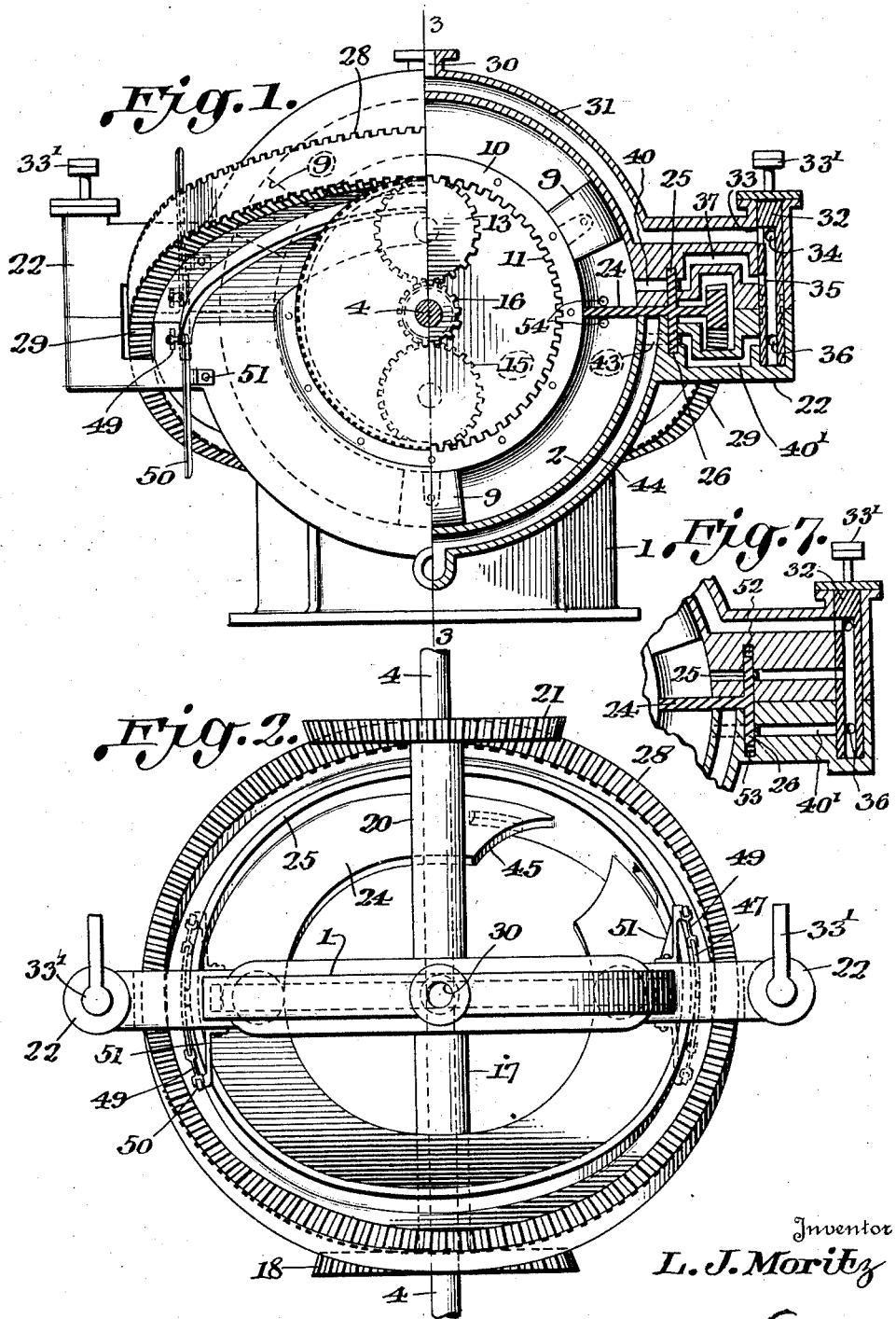

Patented July 2, 1929.

1,719,378

UNITED STATES PATENT OFFICE.

LOUIS JOHN MORITZ, OF CALGARY, ALBERTA, CANADA.

ROTARY ENGINE.

Application filed December 8, 1926. Serial No. 153,421.

It is well known that rotary engines have many points of advantage over the usual reciprocating engines, but previously it has been common to use the reciprocating sliding valve in connection with rotary pistons. This construction has been open to numerous objections and it is the purpose of this invention to avoid such objections by the use of a rotary valve.

The invention, therefore, comprises an engine in which the pistons rotate constantly in one direction or the other and in which the admission and exhaust of steam or other fluid under pressure is controlled by means of a rotary valve which also rotates continuously in one direction or the other. Details of the invention will be apparent from the following description and will be defined in the appended claims.

In the drawings:

Figure 1 is a view of an engine embodying the invention, the left hand side of the figure being an elevation, and the right hand side being a vertical section.

Figure 2 is a top plan view of the engine.

Figure 3 is a vertical section taken substantially on the line 3—3 of Figure 1.

Figure 4 is a sectional view of a portion of the mechanism showing the exhaust port.

Figure 5 is a side elevation of the engine.

Figure 6 is a detail view showing means for regulating the inlet ports from the valve casing into the engine cylinder.

Figure 7 shows a modification of the rotary valve member.

The main casting of the engine 1 may be in two parts bolted together in any suitable manner, and comprises a cylinder 2 in the form of an annular ring. This cylinder has a continuous slot 3 on its inner periphery.

A shaft 4 is located coaxially with the ring cylinder 2 and has splined thereto at 5 a disc member 6, the outer edge of which fits in the slot 3 and is provided with packings 7 and 8 to form a fluid tight joint. The packing 7 is located partly in the disc member 6 and partly in the cylinder wall while the packing 8 is located entirely in the disc member and contacts with the wall of the cylinder. Carried by this disc member are three pistons 9 which, as shown in Figure 1, are spaced equidistantly and which fill the cylinder 2 and move therein under the force of steam or other liquid applied to said pistons.

The cylinder 2 has affixed thereto a pair of rings 10 having internal gear teeth 11. A stud 12 is carried by one side of the disc 6 at a point equidistant between the shaft and the cylinder and supports a small gear 13. On the other side of the disc and the opposite side of the shaft is a similar stud 14 carrying a small gear 15. The gear 13 meshes with one of the internal gears 11 and with a gear 16 on the inner end of a sleeve 17 mounted to rotate freely on the shaft 4, which sleeve has at its outer end a relatively large bevel gear 18. The pinion 15 meshes with a similar gear 19 on a sleeve 20 mounted on the shaft 4 and carrying a large bevel gear 21 at its outer end. It is obvious that a rotation of the disc 6 will cause the gears 13 and 15 to rotate, which in turn through the connections described will rotate the bevel gears 18 and 21.

At each side of the engine is provided a valve casing 22 and since the construction of the valve mechanism is similar at each side of the casing, only one will be described in detail. A rotary valve member 23 is in the form of a ring and has a web 24 provided with an upper collar 25 and a lower collar 26. Outside of these collars the web is extended as shown at 27 and has an enlarged rim having a gear 28 on one side and a gear 29 on the other side. As clearly shown in Figure 1, this rotary valve passes through each valve casing and is guided therein by means of the web 24 and the collars 25 and 26, which fit snugly in passages provided therefor in said casings. When in position the gear 28 will mesh with the bevel gear 21 while the gear 29 will mesh with the bevel gear 18. In this manner the rotary valve member is mounted for rotation in its proper position. It is also evident that a rotation of the shaft 4 and disc 6 will through the train of gearing previously described cause a rotation of the sleeves 17 and 20 and consequently of the bevel gears 18 and 21. The rotation of these gears will cause a rotation of the valve member 23 and the relative speed of rotation of such valve member can be determined by a proper choice of the various gears employed.

Steam or other fluid under pressure will be admitted through an intake port 30 and through a passage 31 leading therefrom to the valve mechanism. The passage of steam from the valve mechanism through the rotary valve into the cylinder 2 is controlled in the following manner.

In each valve casing is mounted a valve 32 in the form of a hollow tube. Near the upper end thereof this valve is provided with ports 33 and 34 located at right angles to each other and affording communication from the passage 31 to the hollow center of the valve 32. Intermediate its ends there is provided a port 35 which is in operative position when the engine is driven forward and near the bottom is a port 36 located at right angles to the port 35 which is in operative position when it is desired to drive the engine in reverse direction.

When the parts are in the position shown in Fig. 1 the incoming fluid passes through the passage 31 and port 33 into the interior of the valve stem 32 and through said interior through the port 35 into a passage 37 in the valve casing. As shown in Figure 6, the valve casing has an elongated port 38 and the collar 25 of the rotary valve has a correspondingly positioned port 39 adapted to register with the port 38 at certain times. The fluid under pressure will, therefore, pass from the passage 37 through the ports 38 and 39 and a short passage 40 in the valve casing into the cylinder 2 immediately in the rear of one of the pistons 9. It will be noted at this time that the web 24 forms a cylinder head and prevents movement of the fluid in the opposite direction.

When it is desired to reverse the movement of the engine the valve stem 32 is rotated 90° by means of a handle 33' and the port 34 is brought into communication with the passage 31 while the port 36 is brought into communication with the passage 40' in the lower side of the valve casing. As shown in Figure 6, the valve casing is provided with a port 41 which registers with a port 42 in the lower collar 26, thus allowing the fluid under pressure to pass through these ports and through a short passage 43 similar to the passage 40 into the cylinder 2 but on the opposite side of the web 24 so that the pistons will be driven in reverse direction.

It will be noted that the path of movement of the pistons 9 and the path of movement of the web 24 intersect. In order to allow the pistons to pass freely, the web 24 has a cutout 45 through which the piston may pass just before the corresponding inlet passage is opened. Since there are three pistons located 120° apart and since there is a valve mechanism at each side of the casing, it is obvious that the cutout must move through a distance of 180° while a piston is moving through a distance of 60°. In other words, the train of gearing must be such that the rotary valve member 23 shall rotate three times as fast as do the pistons.

When the engine is rotating forwardly, the pistons 9 are moving in a counterclockwise direction as viewed in Fig. 1 and the pressure at the left hand side of the lower piston 9 in Figure 1 is exhausted through the cutout 45 in the web 24, thence through the exhaust passage 44 in the left hand valve casing just at the time when the piston 9 shown in dotted lines passes through the cutout 45 in the web 24. Similarly the pressure in the rear of the upper right hand piston 9 exhausts through a corresponding exhaust passage of the right hand valve casing just at the time that the lower piston 9 passes through the cutout at this side of the engine. The exhaust passages operate similarly whether the engine is running forward or in reverse direction.

Openings 54 in the side of the cylinder are for the purpose of releasing the compression in front of the piston and these are controlled by a three way valve connected to the reverse control of the engine so as to open these to the atmosphere at the proper time dependent upon the direction of rotation of the pistons. This mechanism in itself is old and is, therefore, not disclosed in detail.

It is sometimes desirable to be able to vary the effective area of the ports 38 and 41 in the valve casing. Mechanism for this purpose may be provided as shown in Figure 6. In connection with each port there is provided a sliding shutter 46 operated by a rod 47 passing through a packing 48. The outer end of this rod is connected by a link 49 to a lever 50 pivoted to a bracket 51 carried by the side of the valve casing. By moving the lever in one direction or the other, the effective area of the ports may be varied.

There is shown in Figure 7 a fragmentary view of a modification in which the parts 27, 28 and 29 are omitted and gear teeth 52 and 53 are formed directly on the edges of the flanges or collars 25 and 26 respectively and mesh directly with the gears 21 and 18 respectively. In this construction the levers 50 which operate the mechanism for varying the effective area of the ports 38 and 41 may be connected so that they will operate simultaneously but in opposite directions.

It may be noted that the packing 8 is located entirely in the disc member 6 but may be eccentric so that it will have a wiping effect on the walls of the cylinder.

It will be apparent from the foregoing description that the invention combines a cylinder having a plurality of rotary pistons mounted therein with a rotary valve mechanism controlling the admission of fluid under pressure through said pistons at the proper time. It is obvious that the construction will provide a very smooth and noiseless operation with substantially no vibration. It is also to be noted that the direction of operation of the engine may be readily reversed as desired. It is apparent that various details may be widely modified without in any way departing from the spirit of the invention which is to be regarded as limited only by the scope of the appended claims.

I claim as my invention:

1. A rotary engine comprising a stationary ring-shaped hollow cylinder, a disk-shaped member mounted on a rotatable shaft and having pistons fitting in said cylinder, a valve casing at the side of said cylinder communicating therewith, and a circular member rotatable on an axis at an angle to the axis of said shaft and having a web intersecting said cylinder and forming a cylinder head and a collar passing through said casing and provided with a port controlling the admission of fluid under pressure to said cylinder.

2. A rotary engine comprising a stationary ring-shaped hollow cylinder having an exhaust passage, a disk-shaped member mounted on a rotatable shaft and having pistons fitting in said cylinder, a valve casing at the side of said cylinder communicating therewith, and a circular member rotatable on an axis at an angle to the axis of said shaft and having a web intersecting said cylinder and forming a cylinder head and a collar on each side thereof passing through said casing, each collar provided with a port controlling the admission of fluid under pressure to said cylinder.

3. A rotary engine comprising a stationary ring-shaped hollow cylinder having an exhaust passage, a disk-shaped member mounted on a rotatable shaft and having pistons fitting in said cylinder, a valve casing at the side of said cylinder communicating therewith, a circular member rotatable on an axis at an angle to the axis of said shaft and having a web intersecting said cylinder and forming a cylinder head and a collar on each side thereof passing through said casing and provided with a port controlling the admission of fluid under pressure to said cylinder, and means for admitting fluid to either port as desired.

4. A rotary engine comprising a stationary ring-shaped hollow cylinder having an exhaust passage, a disk-shaped member mounted on a rotatable shaft and having pistons fitting in said cylinder, a valve casing at the side of said cylinder communicating therewith, a circular member rotatable on an axis at an angle to the axis of said shaft and having a web intersecting said cylinder and forming a cylinder head and a collar on each side thereof passing through said casing, each collar provided with a port controlling the admission of fluid under pressure to said cylinder, and means for rotating said circular member.

5. A rotary engine comprising a stationary ring-shaped hollow cylinder having an exhust passage, a disk-shaped member mounted on a rotatable shaft and having pistons fitting in said cylinder, a valve casing at the side of said cylinder communicating therewith, a circular member rotatable on an axis at an angle to the axis of said shaft and having a web intersecting said cylinder and forming a cylinder head and a collar on each side thereof passing through said casing and each collar provided with a port controlling the admission of fluid under pressure to said cylinder, means for admitting fluid to either port as desired, and means for rotating said circular member.

6. A rotary engine comprising a stationary ring-shaped hollow cylinder having an exhaust passage, a disk-shaped member mounted on a rotatable shaft and having pistons fitting in said cylinder, a valve casing at the side of said cylinder communicating therewith, a circular member rotatable on an axis at an angle to the axis of said shaft and having a web intersecting said cylinder and forming a cylinder head and a collar on each side thereof passing through said casing, each collar provided with a port controlling the admission of fluid under pressure to said cylinder, and means controlled by the rotation of said disk-shaped member for rotating said circular member.

7. A rotary engine comprising a stationary ring-shaped hollow cylinder, a disk-shaped member mounted on a rotatable shaft and having pistons fitting in said cylinder, a circular member rotatable on an axis at an angle to the axis of said shaft and having a web intersecting said cylinder and forming a cylinder head and a collar provided with a port controlling the admission of fluid under pressure to said cylinder, fixed racks on said cylinder, gears carried by said disk-shaped member and meshing with said racks, and means operated by said gears for rotating said circular member.

8. A rotary engine comprising a stationary ring-shaped hollow cylinder, a disk-shaped member mounted on a rotatable shaft and having pistons fitting in said cylinder, a circular member rotatable on an axis at an angle to the axis of said shaft and having a web intersecting said cylinder and forming a cylinder head and a collar provided with a port controlling the admission of fluid under pressure to said cylinder, sleeves on said shaft, bevel gears on said sleeves, racks on said circular member meshing with said bevel gears, and means for rotating said sleeves from said disk-shaped member.

9. A rotary engine comprising a stationary ring-shaped hollow cylinder having an exhaust passage, a disk-shaped member mounted on a rotatable shaft and having pistons fitting in said cylinder, a valve casing at each side of said cylinder communicating therewith, and a circular member rotatable on an axis at an angle to the axis of said shaft and having a web intersecting said cylinder and forming a cylinder head, and a collar passing through said casing and provided with a port controlling the admission of fluid under pressure to said cylinder.

10. A rotary engine comprising a stationary ring-shaped hollow cylinder, a disk-shaped member mounted on a rotatable shaft and having pistons fitting in said cylinder, a valve casing at each side of said cylinder communicating therewith, and a circular member rotatable on an axis at an angle to the axis of said shaft and having a web intersecting said cylinder and forming a cylinder head, and a collar on each side thereof passing through said casings, each collar provided with a port controlling the admission of fluid under pressure to said cylinder.

11. A rotary engine comprising a stationary ring-shaped hollow cylinder having an exhaust passage, a disk-shaped member mounted on a rotatable shaft and having pistons fitting in said cylinder, a valve casing at each side of said cylinder communicating therewith, and a circular member rotatable on an axis at an angle to the axis of said shaft and having a web intersecting said cylinder and forming a cylinder head, a collar on each side thereof passing through said casings, each collar provided with a port controlling the admission of fluid under pressure to said cylinder, and means for rotating said circular member.

12. A rotary engine comprising a stationary ring-shaped hollow cylinder, a disk-shaped member mounted on a rotatable shaft and having pistons fitting in said cylinder, a valve casing at the side of said cylinder communicating therewith, a circular member rotatable on an axis at an angle to the axis of said shaft and having a web intersecting the cylinder and forming a cylinder head and a collar passing through said casing and provided with a port controlling the admission of fluid under pressure to said cylinder, and shutter means for varying the effective area of said port.

13. A rotary engine comprising a stationary ring-shaped hollow cylinder, a disk-shaped member mounted on a rotatable shaft and having pistons fitting in said cylinder, a valve casing at the side of said cylinder communicating therewith, a circular member rotatable on an axis at an angle to the axis of said shaft and having a web intersecting the cylinder and forming a cylinder head and a collar passing through said casing and provided with a port controlling the admission of fluid under pressure to said cylinder, and shutter means carried by the valve casing for varying the effective area of said port.

In testimony whereof, I have hereunto subscribed my name.

LOUIS JOHN MORITZ.